April 6, 1937.  L. C. POWELL  2,076,207
DISTORTION CHECK FOR WELDING APPARATUS
Filed Jan. 28, 1936  2 Sheets-Sheet 2
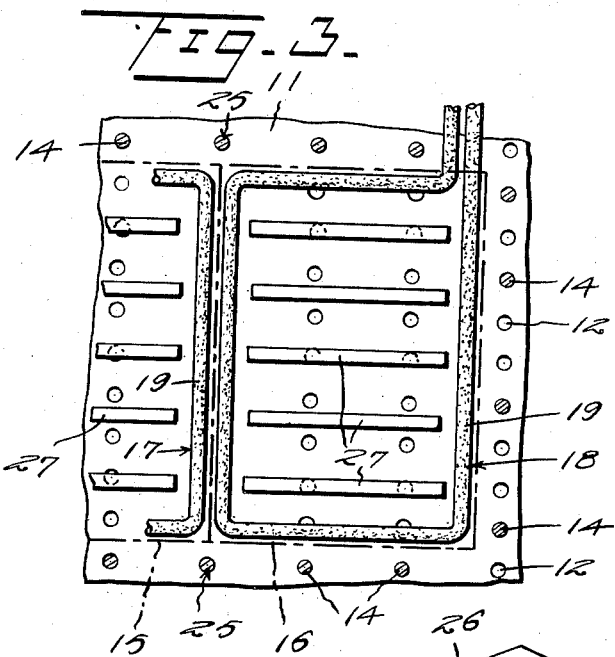
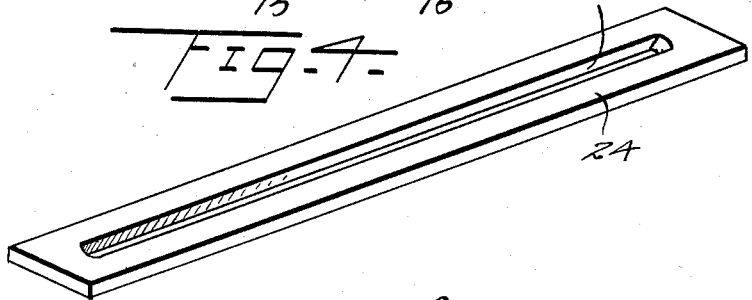
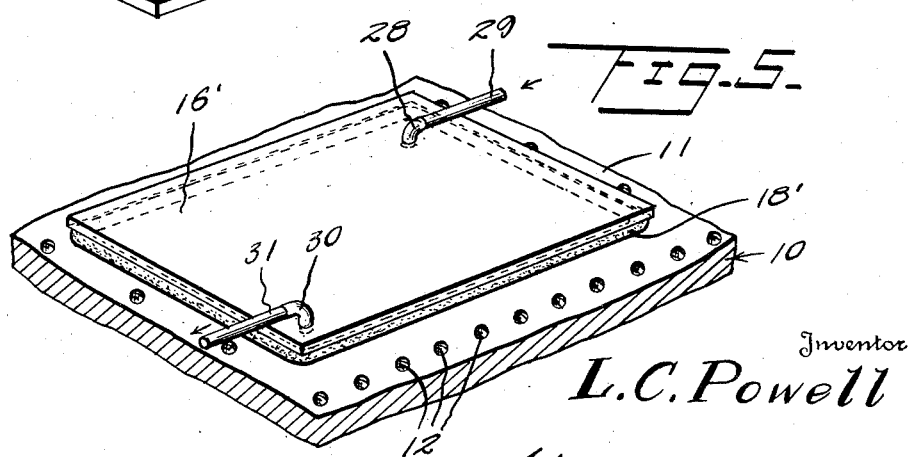
Inventor
L. C. Powell
By Watson E. Coleman
Attorney Patented Apr. 6, 1937

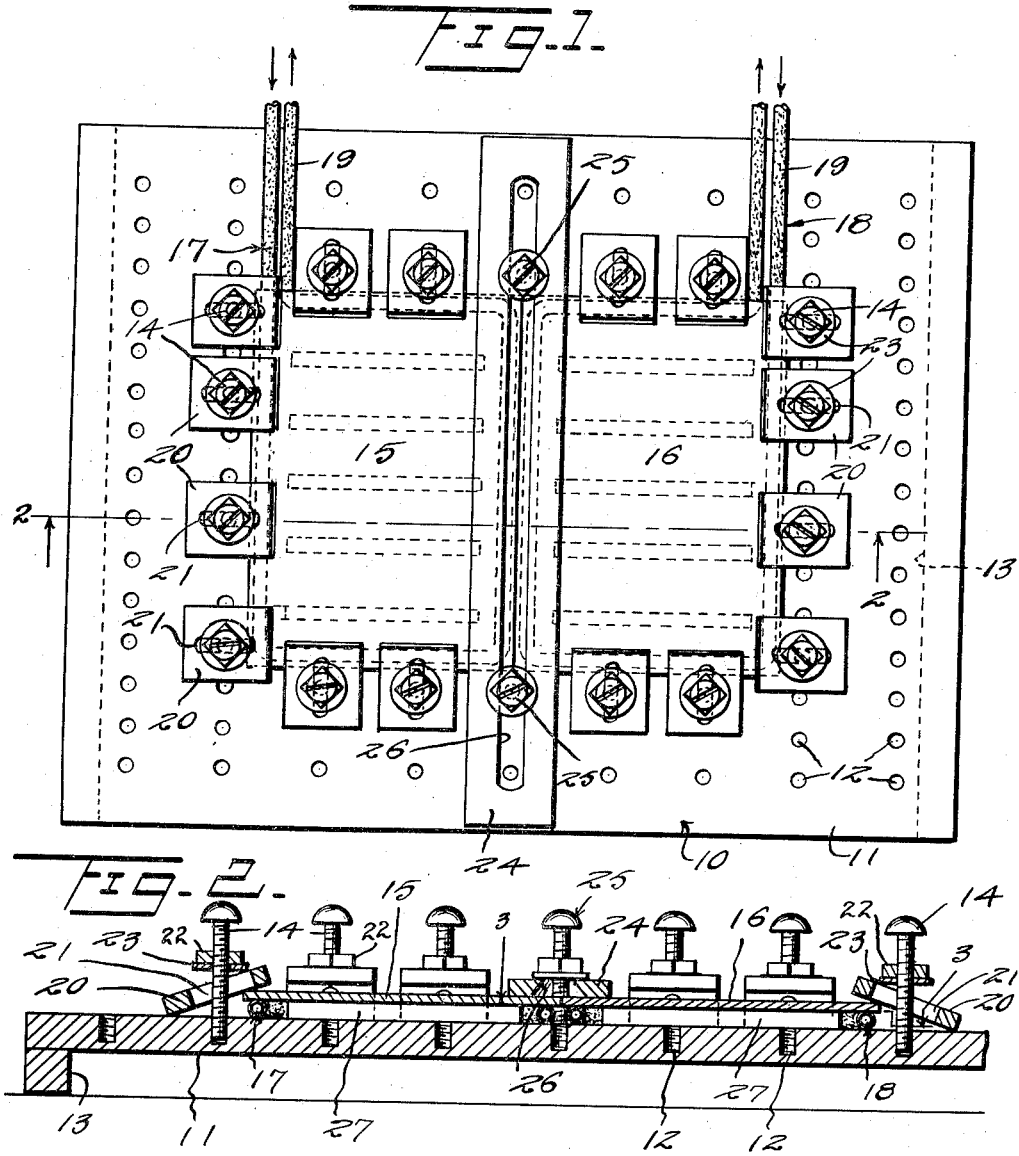

2,076,207

UNITED STATES PATENT OFFICE 2,076,207

DISTORTION CHECK FOR WELDING APPARATUS

Laurence C. Powell, Portsmouth, Va.

Application January 28, 1936, Serial No. 61,255

4 Claims. (Cl. 113—99)

This invention relates to welding devices and more particularly to a form used for holding articles which are adapted to be welded together.

An object of this invention is to provide a means in the form of a plate or table with clamping means thereon so that different types of articles may be firmly clamped on the plate or table and held in the desired position so that the articles may be welded together.

Another object of this invention is to provide in a device of this kind means whereby the bodies of the two articles which are to be welded together may be maintained in a relatively cooled condition and only a relatively narrow strip of each article exposed.

A further object of this invention is to provide means whereby the articles to be welded together, where the articles are relatively thin plates, may be held against buckling with the bodies of the articles cooled by a cooling agent and maintained in spaced relation to the bed or clamping plate.

The above and various other objects and advantages of this invention will in part be described in, and in part be understood from the following detail description of the present preferred embodiment, the same being illustrated in the accompanying drawings, wherein:

Figure 1 is a top plan of a device constructed according to an embodiment of this invention.

Figure 2 is a fragmentary enlarged sectional view taken on the line 2—2 of Figure 1.

Figure 3 is a sectional view taken on the line 3—3 of Figure 2.

Figure 4 is a perspective view of the slotted guide and clamping bar.

Figure 5 is a fragmentary perspective view of a modified form of cooling means for the articles to be welded.

Figure 6 is an enlarged transverse section through one of the tubular cooling members shown in Figure 1.

Referring to the drawings wherein like symbols designate corresponding parts throughout the several views, the numeral 10 designates generally a bed in the form of a rectangular plate 11 which is provided at each end with dependent flanges 13 so that the plate 11 will be disposed in upwardly spaced relation to a supporting surface on which the flanges or legs 13 are resting.

The bed 10 is preferably made of metal of suitable thickness and is provided on the upper surface thereof with a plurality of spaced apart holes 12 which are threaded in order to receive threaded clamp tightening members 14. Where two plates are adapted to be welded together in abutting relation, the two plates are disposed on top of the bed 10, as shown in Figures 1 and 2. One plate 15 is disposed in the desired position on top of the bed 10 and the other plate 16 is disposed with the edge to be welded abutting against the adjacent edge of the plate 15.

A tubular gasket 17 is interposed between the plate 15 and the top of the bed 10 and a similar gasket 18 is disposed between the plate 16 and the top of the bed 10. These gaskets 17 and 18 are bent in substantially rectangular shape, the shape of the gaskets being determined primarily by the shapes of the articles which are to be welded together, it being understood that these gaskets 17 and 18 are readily conformable to the shapes of the articles which are being welded together. Preferably, these gaskets 17 and 18 are hollow and are formed with an outer covering 19 which is preferably of asbestos or like material which is not readily affected by heat. One end of each gasket 17 and 18 is adapted to be connected to a source of cooling supply in the form of water or other liquid and the other end is adapted to be connected to an outlet so that the cooling agent may freely flow through the gaskets and thereby maintain the marginal portions of the plates to be welded in a cooled condition.

The plates 15 and 16 are securely held on the bed 10 by means of a plurality of clamping members in the form of blocks 20 which are provided with an elongated slot 21 through which the tightening member 14 is adapted to pass. The tightening bolts 14 are provided with nuts 22 and a washer 23 so that these nuts 22 may be turned down against the upper faces of the clamping blocks 20 and thus tightly hold the plates 15 and 16 against the gaskets 17 and 18. As shown in Figure 2, the inner or abutting edges of the plates 15 and 16 have an elongated slotted clamping or guide bar 24 secured thereover as by securing members 25. The clamping bar 24 has an elongated slot 26 extending longitudinally thereof and this slot 26 is of such a width that the welding tool may readily engage the abutting edges of the two plates 15 and 16. Preferably, the slot 26 is undercut, as shown in Figure 2, so that when the abutting edges of the plates 15 and 16 are heated under the flame or welding tool, the guide member 24 will not be unduly affected by the heat.

A plurality of elongated bars 27 are disposed between the plates 15 and 16 and the bed 10 and are disposed inside the gaskets 17 and 18. These bars 27 are adapted to prevent the plates 15 and 16 from buckling downwardly during the welding operation. If desired, some form of weight may be placed on top of the plates 15 and 16 inside the clamping members 20 so that the plates 15 and 16 will be held against upward buckling by such weights.

In Figure 5, there is shown a modified form of cooling means for the plates which are to be welded together and in this form one of the plates 16' is provided with suitable spaced apart openings and a pipe connection 28 is threaded into one of the openings and a pipe 29 secured to this connection 28. This connection 28 is an inlet connection and a diagonally disposed outlet connection 30 is threaded into an opening provided in the plate 16' and an outlet pipe 31 connected to this connection or L30. In this form the gasket 18' may either be solid or hollow and is preferably of substantially endless construction. The bed 10 used with the modified form of cooling means is the same bed as that shown in Figures 1 and 2 and the plate 16' is adapted to be clamped by means of the clamping members and the tightening elements 14 and 22. These clamping members are not shown in Figure 5 but it will be understood that the plate 16' with the abutting plate will be firmly clamped to the bed 10 in the same manner as the plates 15 and 16. The space between the underside of the plate 16' and the top of the bed 10 may also be partly filled by means of a plurality of blocks so as to thereby prevent downward buckling of the plate 16' during the welding operation.

In the use and operation of this device, the articles which are to be welded together are placed on the bed 10 and the gaskets 17 and 18 interposed therebetween. The blocks 27 are positioned inside the gaskets 17 and 18 and then the clamping blocks 20 are placed in position so as to tightly hold the plates 15 and 16 with their abutting edges in the desired relation to each other so that a butt weld may be formed. It will, of course, be understood that the device hereinbefore described may be used for other forms of welding than butt welding. The desired cooling agent is forced through the hollow gaskets 17 and 18 and after the clamping bar 24 has been disposed in proper position with the slot 26 exposing the joint to be welded, the tool may be moved along the slot 26 and the joint properly welded. The guide bar 24 will serve as a guiding means for the tool and the use of the undercut slot 26 will permit the desired quantity of welding metal to be placed along the abutting ends of the two plates 15 and 16. As shown in Figure 2, the holes 12 preferably do not extend entirely through the bed 10 so that where the cooling means shown in Figure 5 is used the water or other cooling agent will not leak out through the underside of the bed 10.

In the construction shown in Figures 1, 2 and 3, the area inside the gaskets 17 and 18 may also be filled with a cooling agent after the manner of the construction shown in Figure 5 so that not only the marginal edge portions of the plates to be welded may be cooled but also the entire bodies of the plates may be cooled. This latter procedure may be accomplished by closing the spaces between the ends of the gaskets 17 and 18.

Where the plates are relatively thin the plates may be held against upward buckling by using a number of elongated bars 24 across the upper surfaces of the two plates, these bars 24 not only acting as a clamping means but also as a means to prevent buckling of the plates in an upward direction and by the use of these bars 24 any awkward weights on top of the plates will be eliminated and the welding operation thereby facilitated.

I claim:—

1. A device as set forth comprising a relatively flat bed provided with a plurality of spaced apart holes in the upper surface thereof, a plurality of clamping members engaging in said holes and adapted to tightly hold an article to be welded on top of the bed, and means adapted to be interposed between the article to be welded and the top of the bed for cooling the article to be welded.

2. A device as set forth comprising a relatively flat bed provided with a plurality of threaded holes in the upper surface thereof, threaded clamping members engaging in said holes, and a tubular cooling member adapted to be disposed inwardly of said clamping members and interposed between the article to be welded and the top of the bed.

3. A device as set forth comprising a bed provided with a plurality of threaded holes in the upper surface thereof, a plurality of threaded clamping members engaging in said holes and adapted to be disposed about the marginal portions of a pair of articles to be clamped on to the bed and elongated welding bar overlying the abutting edges of the articles to be welded and provided with an elongated slot whereby to expose the abutting edges of the articles and means adapted to be interposed between the article to be welded and the top of the bed for cooling the article to be welded.

4. A welding device comprising a supporting member for supporting an article to be welded, clamping means for holding the article to be welded on the member, and means adapted to be interposed between the article to be welded and said member for cooling the article during the welding thereof.

LAURENCE C. POWELL.